US008667085B2

(12) United States Patent
Bae et al.

(10) Patent No.: US 8,667,085 B2
(45) Date of Patent: Mar. 4, 2014

(54) METHODS AND APPARATUSES FOR A NETWORK BASED ON HIERARCHICAL NAME STRUCTURE

(75) Inventors: Young in Bae, Seongnam-si (KR); Jae Hoon Kim, Yongin-si (KR); Myeong Wuk Jang, Hwaseong-si (KR); Byoung Joon Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 77 days.

(21) Appl. No.: 13/486,106

(22) Filed: Jun. 1, 2012

(65) Prior Publication Data
US 2012/0311079 A1 Dec. 6, 2012

(30) Foreign Application Priority Data

Jun. 2, 2011 (KR) .......................... 10-2011-0053457

(51) Int. Cl.
*G06F 15/16* (2006.01)
(52) U.S. Cl.
USPC .......................................... 709/217; 709/224
(58) Field of Classification Search
USPC .................. 709/200–203, 217–227
See application file for complete search history.

(56) References Cited

U.S. PATENT DOCUMENTS

| | | | |
|---|---|---|---|
| 6,026,402 A * | 2/2000 | Vossen et al. | 1/1 |
| 7,035,838 B2 * | 4/2006 | Nelson et al. | 1/1 |
| 2004/0133606 A1 | 7/2004 | Miloushev et al. | |
| 2008/0109481 A1 * | 5/2008 | Catanzariti et al. | 707/104.1 |
| 2008/0172391 A1 * | 7/2008 | Adelman et al. | 707/9 |
| 2009/0285209 A1 | 11/2009 | Stewart et al. | |
| 2009/0288163 A1 | 11/2009 | Jacobson et al. | |
| 2010/0162173 A1 | 6/2010 | Schmitlin et al. | |
| 2011/0179040 A1 | 7/2011 | Bessonov et al. | |
| 2012/0290696 A1 * | 11/2012 | Wu et al. | 709/223 |

OTHER PUBLICATIONS

European Search Report issued Oct. 26, 2012 in counterpart European Patent Application No. 12170226.0 (7 pages, in English).
Jacobson, Guy et al. "Focusing Search in Hierarchical Structures with Directory Sets" ACM, 1998 (9 pages, in English).
Kim, Jaehoon, et al., "Content Centric Network-based Virtual Private Community," 2011 IEEE International Conference on Consumer Electronics (ICCE), pp. 843-844 (in English).
Lee, Junghwan, et al., Layered video content awarded packet scheduling model over content centric network, 2010, pp. 297-300, vol. 37, No. 1(D).

* cited by examiner

*Primary Examiner* — Moustafa M Meky
(74) *Attorney, Agent, or Firm* — NSIP Law

(57) ABSTRACT

Provided are communication devices and methods for requesting content in a network based on a hierarchical name structure. A content requester may search for content without the use of the entire content name in the network based on the hierarchical name structure.

23 Claims, 8 Drawing Sheets

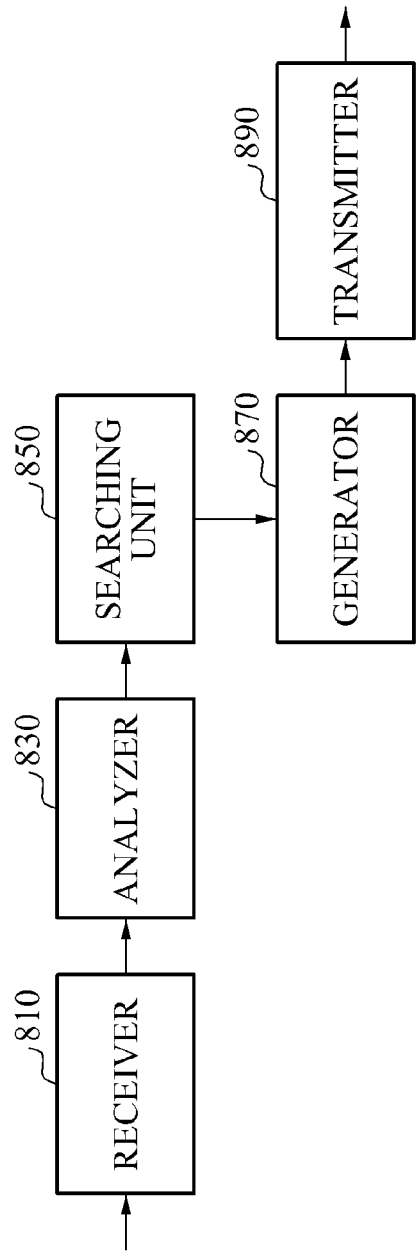

METHODS AND APPARATUSES FOR A NETWORK BASED ON HIERARCHICAL NAME STRUCTURE

CROSS-REFERENCE TO RELATED APPLICATION(S)

This application claims the benefit under 35 USC §119(a) of Korean Patent Application No. 10-2011-0053457, filed on Jun. 2, 2011, in the Korean Intellectual Property Office, the entire disclosure of which is incorporated herein by reference for all purposes.

BACKGROUND

1. Field

The following description relates to a communication method and apparatus for a content requester and a content provider in a network that is based on a hierarchical name structure.

2. Description of Related Art

Typically an Internet protocol (IP) is used as a network layer protocol on the Internet. However, a network layer protocol that is based on a destination address may cause several issues because of the rapid development of the Internet. For example, traffic congestion may occur due to a great number of users concentrating on several nodes that have popular content.

An extension of a network may be used to handle the rapidly increasing amount of Internet use due to the increased number of users of smart phones, tablets, computers, and the like. Accordingly, a network based on a hierarchical name structure may be used.

Unlike an IP that forwards a packet based on a destination address value, for example, 75.2.35.27 within an IP header, the network based on a hierarchical name structure may instead use a hierarchical name of content. However, the network based on a hierarchical name structure may forward a content request packet to another node through a request that matches the full content name. That is, a user must have the full hierarchical name of the content in order to request the content. Accordingly, a user requesting content may not be provided with the content when the user only has a fragment of, or inaccurate information about a hierarchical name. Also, transmitting of the entire content name may diminish resources.

Accordingly, there is a desire for a communication method for requesting desired content and responding to the request without the constraint of using the entire hierarchical name of content.

SUMMARY

In one aspect, there is provided a communication method for a content requester in a network based on a hierarchical name structure, the communication method including generating a content search request packet comprising a portion of but not an entire hierarchical name of content corresponding to a content search request, and requesting a communication device included in at least one virtual community in the network based on a hierarchical name structure to search for the content by transmitting the content search request packet.

The at least one virtual community may comprise at least one of a first virtual community as a lowest level community including the communication device, a second virtual community as a higher level community than the first virtual community, and sharing information with the first virtual community and being combined with the first virtual community, and a third virtual community as a higher level community than the second virtual community, sharing information of the second virtual community, and being generated by an interconnection between the second virtual community.

The communication device may comprise content having a prefix for each of the first virtual community, the second virtual community, and the third virtual community, and comprises a hierarchical name generated based on a content name included in the at least one communication device.

The communication method may further comprise receiving, from the communication device, a first response packet comprising the hierarchical name of content requested by the content search request, generating and transmitting a content request packet requesting the communication device for the content corresponding to the content search request, and receiving a second response packet, transmitted from the communication device, comprising the content corresponding to the content search request.

The generating may comprise inserting an indicator into the content search request packet, the indicator indicating a predetermined command.

The generating may comprise inserting an indicator into the content search request packet, the indicator designating a search area based on the hierarchical name of the content.

The generating may comprise inserting an indicator into the content search request packet, the indicator designating a search area based on a name of the at least one virtual community recognized using the hierarchical name of the content, or based on a name of a member included in the at least one virtual community.

The generating may comprise inserting an indicator into the content search request packet, the indicator requesting a search for the content based on a keyword requested by the content requester.

The generating may comprise inserting an indicator into the content search request packet, the indicator requesting a search for the content based on information recognized based on metadata of the requested content.

The information recognized based on the metadata of the requested content may comprise at least one of a content type, a date on which the content is generated, a location at which the content is generated, and a request frequency for the content and accumulation information including routing information for the content, generated due to a transmission of the content.

The generating may comprise inserting an indicator into the content search request packet, the indicator generated by combining at least two of the hierarchical name of the content, a keyword requested by the content requester, and information recognized based on metadata of the requested content.

In another aspect, there is provided a communication method for a content provider in a network based on a hierarchical name structure, the communication method including analyzing a content search request packet comprising a portion of but not an entire hierarchical name of content corresponding to a content search request which is received to from a content requester included in at least one virtual community in the network based on the hierarchical name structure, searching for the requested content based on a result of the analysis, generating a response packet comprising the entire hierarchical name of the requested content, and transmitting the response packet to the content requester.

The at least one virtual community may comprise at least one of a first virtual community as a lowest level community including the content provider, a second virtual community as a higher level community than the first virtual community, sharing information of the first virtual community and being combined with first virtual community, and a third virtual community as a higher level community than the second virtual community, sharing information the second virtual community, and being generated by an interconnection between the second virtual community.

The content provider may comprise content having a prefix for each of the first virtual community, the second virtual community, and the third virtual community, and that has a hierarchical name generated based on a content name included in the content provider.

The analyzing may comprise separating an indicator, indicating a predetermined command, inserted into the content search request packet, and analyzing the predetermined command recognized from the separated indicator.

The searching may comprise searching for the content by designating a search area based on the hierarchical name of the content.

The searching may comprise searching for the content by designating a search area based on a name of the at least one virtual community recognized using the hierarchical name of the content, or based on a name of a member included in the at least one virtual community.

The searching may comprise searching for content based on a keyword requested by the content requester.

The searching may comprise searching for the content based on information recognized based on metadata of the requested content.

The communication method may further comprise receiving a request for the content corresponding to the entire content name from the content requester, and providing the requested content to the content requester.

In another aspect, there is provided a non-transitory computer-readable medium comprising a program for instructing a computer to perform the method of the content requester.

In another aspect, there is provided a content requester in a network based on a hierarchical name structure, the content requester including a generator configured to generate a content search request packet comprising a portion of but not an entire hierarchical name of content corresponding to a content search request, and a requester configured to transmit a request for a search for the content to at least one communication device included in at least one virtual community in the network based on a hierarchical name structure.

In another aspect, there is provided a content provider in a network based on a hierarchical name structure, the content provider including an analyzer configured to analyze a content search request packet comprising a portion of but not an entire hierarchical name of content corresponding to a content search request which is received from a content requester included in at least one virtual community in the network based on the hierarchical name structure, a searching unit configured to search for the requested content corresponding to the content search request based on a result of the analysis, and a generator configured to generate a response packet comprising the entire hierarchical name of the requested content.

Other features and aspects will be apparent from the following detailed description, the drawings, and the claims.

BRIEF DESCRIPTION OF THE DRAWINGS

FIG. 8 is a diagram illustrating an example of a content provider in a network based on a hierarchical name structure.

Figure 1:
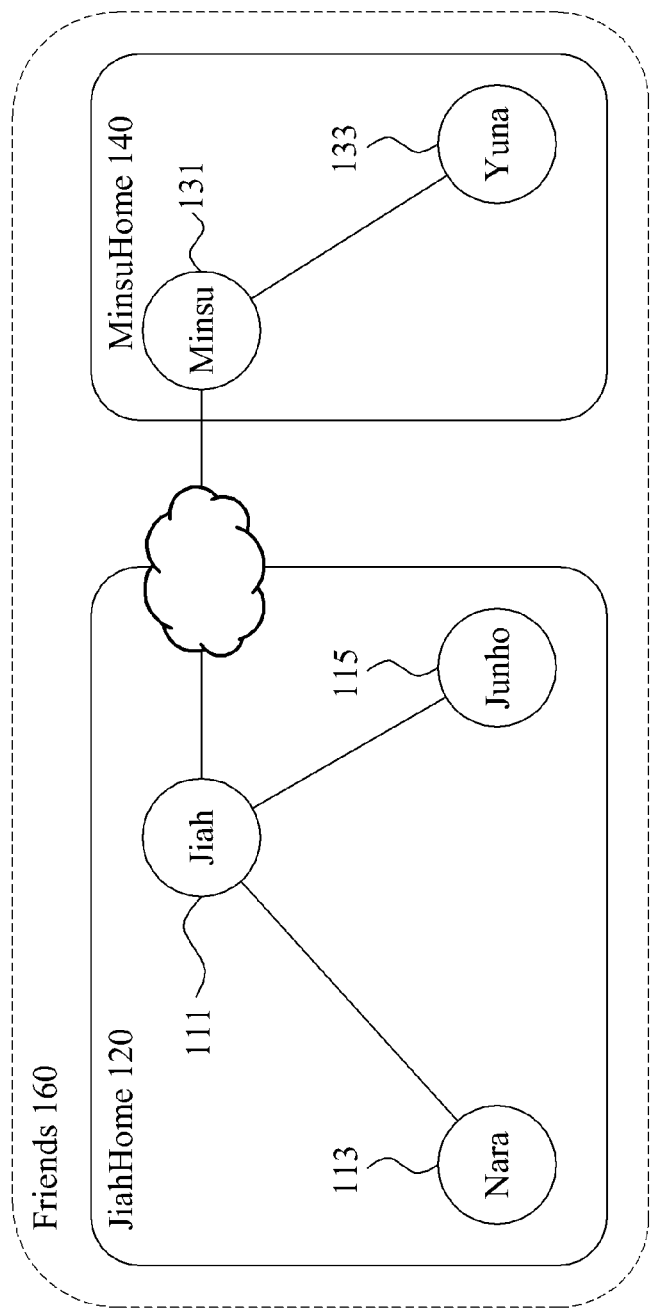
FIG. 1 is a diagram illustrating an example of a virtual community in a network based on a hierarchical name structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

FIG. 1 illustrates an example of a virtual community in a network based on a hierarchical name structure.

A virtual community may be a hierarchical community that is formed through an invitation and a registration between users or between virtual communities in a network environment. For example, the virtual community may include a first virtual community, a second virtual community, and a third virtual community.

Referring to FIG. 1, a first virtual community may correspond to a lowest level of the virtual community, and may be a virtual community for a predetermined user including at least one communication device of the predetermined user. In some examples, the first virtual community may include a plurality of first virtual communities. In the example of FIG. 1, Jiah 111, Nara 113, Junho 115, Minsu 131, and Yuna 133 correspond to the users of the first virtual community. Each user may correspond to at least one communication device.

In this instance, the at least one communication device may include a physical and logical device, and a storage device. Within the virtual communities users may communicate with each other through their devices. For example, a content requester and/or a content provider herein may communicate through a device such as a mobile phone, a tablet, a computer, a server, an appliance, a node, and the like.

The virtual community may form another virtual community through an invitation and registration process between virtual communities, and thus, a larger virtual community may be generated.

The second virtual community may correspond to a higher level community than the first virtual community, may share information of the first virtual community, and may be generated by combining with the first virtual community. In this example, JiahHome 120 and MinsuHome 140 correspond to the second virtual community. In some examples, the second virtual community may include a plurality of second virtual communities. Also, a second virtual community may include one or more first virtual communities. In the example of FIG. 1, the second virtual community MinsuHome 140 includes two first virtual communities, Minsu 131 and Yuna 133.

The third virtual community may correspond to a higher level community than the second virtual community and the first virtual community, may share information from each of the second virtual community and the first virtual community, and may be generated through an interconnection between the second virtual communities. In the example of FIG. 1, Friends 160 corresponds to the third virtual community and is formed by an interconnection between second virtual communities JiahHome 120 and MinsuHome 140.

For example, a prefix of each virtual community may be shared through an invitation and registration process between virtual communities. The content included in each virtual community may have a hierarchical name including a prefix of the corresponding virtual community. The virtual community may generate (or form) a fourth virtual community or a fifth virtual community as a higher level community through an invitation and registration process between virtual communities. The number of hierarchies in the virtual community is not limited.

As an example, a hierarchical name of content may be "xxx.com/sait/comm/yibae/video/abc.avi," and "yibae" may correspond to a user of the first virtual community. In this example, through the hierarchical name of content, it may be known that a user named "yibae" includes a directory named video, and the corresponding directory includes content named "abc.avi." Through the hierarchical name of content, it may be known that "xxx.com" matches the fourth virtual community, "sait" matches the third virtual community, and "comm" matches the second virtual community.

That is, all hierarchies of a hierarchical name structure may correspond to a respective virtual community. For example, each of "xxx.com," "sait," and "yibae" in "ccnx://xxx.com/sait/yibae/pic.jpg" may correspond to a virtual community, and be hierarchical. In this instance, a requested range of a content search may be designated by a name of the virtual community.

A configuration of a virtual community may correspond to a hierarchical name. In some examples herein, the configuration of a virtual community may not correspond to a hierarchical name, and a prefix of a new virtual community may be provided in response to a generation of the new virtual community.

For a user to know the entire hierarchical name of content may be difficult due to the increasing number of virtual communities, and thus an increasing size in the hierarchical name. According to an aspect herein, a network based on a hierarchical name structure may employ a content search scheme using a virtual community and a hierarchical name structure. For example, if a user has information about only a portion of a full name for predetermined content, the user may use prefix information shared during formation of a virtual community to transmit a content search request packet, and to receive the corresponding response packet. In this example, the user may not have the entire content name, but instead, may have a portion of the content name. By transmitting the content search request packet with only a portion of the name, the content requester may receive the entire content name in return.

Referring to FIG. 1, Jiah 111 invites Nara 113 and Junho 115 to form a second virtual community named JiahHome 120. Minsu 131 invites Yuna 133 to form another second virtual community named MinsuHome 140.

JiahHome 120 invites MinsuHome 140 to form a third virtual community named Friends 160. In this example, Jiah-Home 120 and MinsuHome 140 correspond to second virtual communities that are a relatively far apart, and Jiah 111 and Minsu 131 are connected to each other through a relatively stable connection between the two second virtual communities, that is, JiahHome 120 and MinsuHome 140. A request for content between JiahHome 120 and MinsuHome 140 may be performed through Jiah 111 and Minsu 131 because the nodes are connected to each other through a relatively stable connection.

Table 1 shown below illustrates a list and names of content stored in each aforementioned virtual community.

TABLE 1

| VC3 | VC2 | VC1 | CONTENT NAME |
|---|---|---|---|
| Friends | | | Friends/flower.jpg |
| | JiahHome | | Friends/JiahHome/flower.jpg |
| | | Jiah | Friends/JiahHome/Jiah/picnic.jpg |
| | | Nara | Friends/JiahHome/Nara/drama01.avi |
| | | | Friends/JiahHome/Nara/drama02.avi |
| | | Junho | Friends/JiahHome/Junho/wind.wav |
| | MinsuHome | | |
| | | Minsu | Friends/MinsuHome/Minsu/teatree.avi |
| | | Yuna | Friends/MinsuHome/Yuna/sun.jpg |
| | | | Friends/MinsuHome/Yuna/project/proposal.doc |

As shown in Table 1, a prefix of a third virtual community is referred to as VC3_prefix, a prefix of a second virtual community is referred to as VC2_prefix, and a prefix of a first virtual community is referred to as VC1_prefix.

Referring to Table 1, a content name has a form of "<VC3_prefix>/<VC2_prefix>/<VC1_prefix>{/<directory name>}*/file name", and < > may be omitted according to an input of a user or prefix information of a virtual group corresponding to a newly generated file. A content name of Table 1 may not be subject to a predetermined device.

For example, "Friends/finetree.jpg" indicates a "VC3_prefix/file name," and "Friends/MinsuHome/Yuna/project/proposal.doc" indicates a "VC3_prefix/VC2_prefix/VC1_prefix/directory name/file name."

In Table 1, "Friends/finetree.jpg" and "Friends/JiahHome/flower.jpg" are included in a communication device of Jiah 111 corresponding to an invitation sender, and other contents are stored in a communication device of the corresponding first virtual group (that is, the corresponding user).

In this example, "Friends/finetree.jpg" and "Friends/JiahHome/flower.jpg" may be stored in another communication device of Jiah 111. For example, a communication device may have a single storage device, may have a plurality of logical and physical storage devices, and the like.

Figure 2:
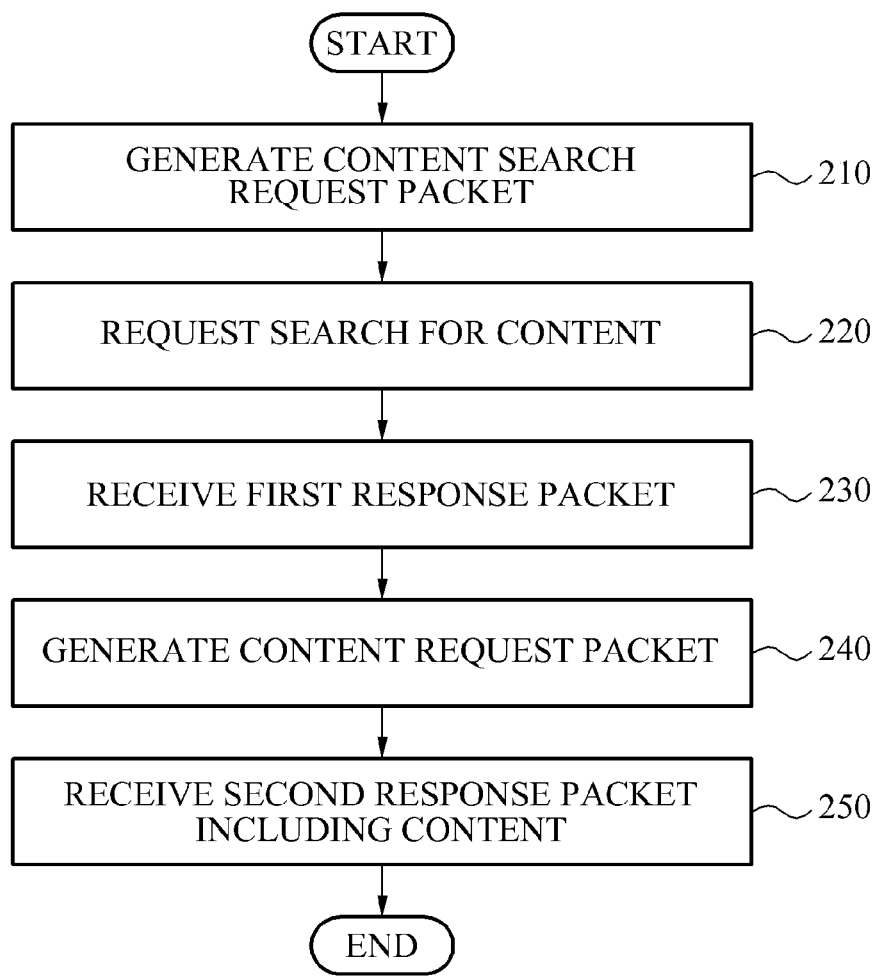
FIG. 2 is a flowchart illustrating an example of a method for a content requester in a network based on a hierarchical name structure.

FIG. 2 illustrates an example of a method for a content requester in a network based on a hierarchical name structure. Hereinafter, a content requester or a content provider may be a communication device that corresponds to a member included in at least one virtual community in the network based on a hierarchical name structure.

Referring to FIG. 2, in 210, the content requester generates a content search request packet including at least a portion of a hierarchical name of a content corresponding to a content search request. For example, the portion of the hierarchical name of the content may include some of the content name, but not the entire content name. For example, the hierarchical name may include a name of a photo, without including the names of the directories (i.e. respective virtual communities) which are included in the entire hierarchical name.

In this example, the content requester may generate the content search request packet by inserting an indicator that indicates a predetermined command into the content search request packet. For example, the indicator may be a command marker inserted into a hierarchical name of content, a field, a flag, a search, and the like inserted into a content search request packet, and the like.

As an example, the predetermined command may designate a search area based on a hierarchical name of content, or designate a search area based on a name of the at least one virtual community recognized based on the hierarchical name of the content or based on a name of a member included in the at least one virtual community. As another example, the predetermined command may request a search for the content based on a keyword requested by the content requester, or request a search for the content based on information recognized based on metadata of the content.

The information recognized based on metadata of the content may include at least one of content characteristic information, for example, a content type, a date on which the content is generated, a location at which the content is generated, and a request frequency for the content. The information recognized based on the metadata may also include accumulation information including routing information for the content, generated due to a transmission of the content.

The content requester may generate the content search request packet by inserting an indicator into the content search request packet, thereby designating an attribute and/or a keyword for content to be searched for by the content provider (which may be referred to as a content responder), or thereby designating a search area. For example, the content requester may insert an indicator generated by combining at least two hierarchical names of the content, a keyword requested by the content requester, and information recognized based on metadata of the content. The command marker is described below as an example of the indicator.

A command marker corresponding to a search of content including a predetermined keyword requested by the content requester may be "keyword.M," and a command marker corresponding to a search of document content including a predetermined keyword may be "document.M." In this example, a command marker for searching for the content including the predetermined keyword requested by the content requester and for searching for the document content may be generated by combining "keyword.M" and "document.M" to form "keyword&document.M."

Referring again to FIG. 2, in 220, the content requester requests at least one communication device included in at least one virtual community to search for the content by transmitting the content search request packet.

For example, the at least one virtual community may include a first virtual community, a second virtual community, and a third virtual community. The first virtual community may correspond to a lowest level of the virtual community, and may be a virtual community for a predetermined user including at least one communication device of the predetermined user.

The second virtual community may correspond to a higher level community than the first virtual community, may share information of the first virtual community, and may be generated by combining with the first virtual community. The third virtual community may correspond to a higher level community than the second virtual community and the first virtual community, may share information of the second virtual community and the first virtual community, and may be generated through an interconnection between the second virtual communities.

The at least one communication device may include content having a prefix for each of the first virtual community, the second virtual community, and the third virtual community. The content may have a hierarchical name generated based on a content name included in the at least one communication device.

In 230, the content requester receives a first response packet including the hierarchical name of the content corresponding to the content search request. In this example the at least one communication device included in the network may transmit the first response packet to the content requester.

In 240, the content requester generates a content request packet requesting the at least one communication device for the content corresponding to the content search request, based on the first response packet.

In 250, the content requester receives a second response packet, transmitted from the at least one communication device, including the content corresponding to the content search request in response to the content request packet.

Figure 3:
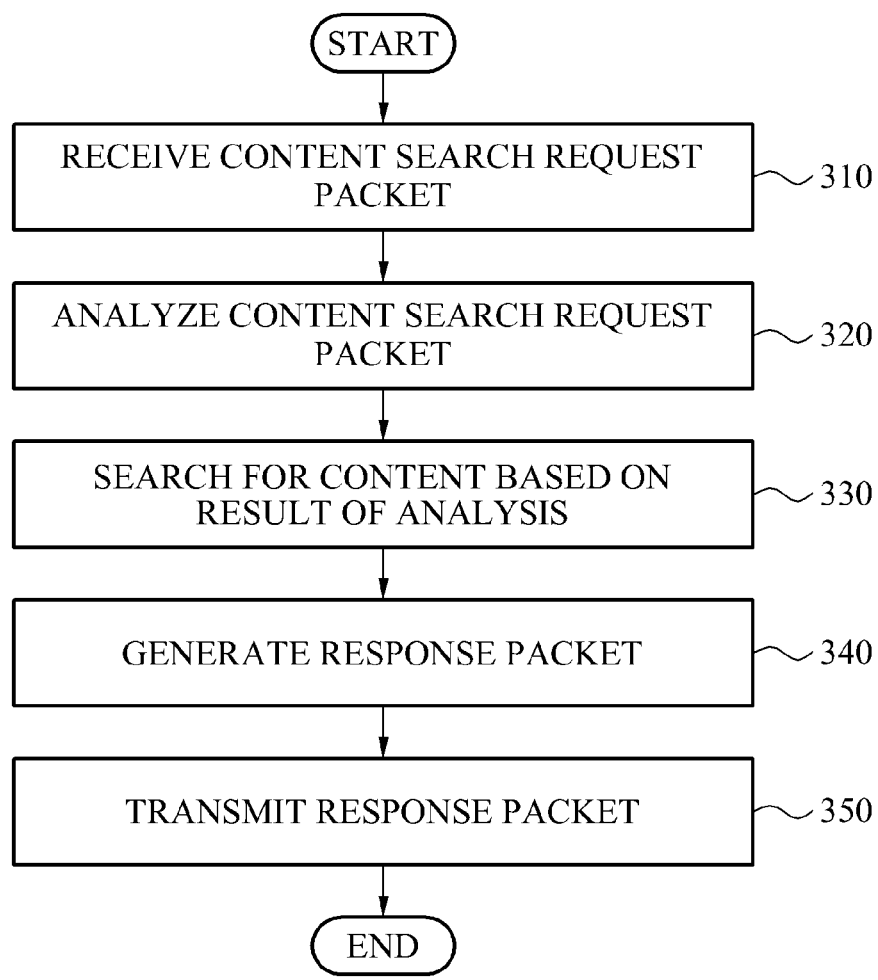
FIG. 3 is a flowchart illustrating an example of a method for a content provider in a network based on a hierarchical name structure.

FIG. 3 illustrates an example of a method for a content provider in a network based on a hierarchical name structure. The content provider may be a communication device which corresponds to a member of a virtual community.

Referring to FIG. 3, in 310, the content provider receives a content search request packet from a communication device included in at least one virtual community in the network based on the hierarchical name structure. An example of the at least one virtual community is described with reference to FIG. 2. The content search request packet may include at least a portion of a hierarchical name of content corresponding to a content search request.

In 320, the content provider analyzes the content search request packet. For example, the content provider may separate an indicator, indicating a predetermined command, which is inserted into the content search request packet. The indicator may include a command marker, a field, a flag, a search, and the like inserted into the content search request packet. The content provider may analyze a request of the content search request packet by analyzing a predetermined command recognized from the separated indicator, that is, the command marker, the field, the flag, the search, and the like.

In 330, the content provider searches for content corresponding to the content search request based on a result of analyzing the predetermined command recognized from the separated indicator. For example, the content provider may search for the content by designating a search area based on the hierarchical name of the content, or search for the content based on a predetermined keyword requested by a content requester.

An example of searching for the content based on a predetermined keyword requested by the content requester and responding to a content request performed by the content provider is described with reference to FIG. 4.

The content provider may search for the content based on information recognized based on metadata of the at least one content. An example of searching for the content based on information recognized based on metadata is described with reference to FIG. 5.

In 330, the content provider searches for the content based on the analysis. For example, the content provider may search for the content by designating a search area based on a name of the at least one virtual community recognized using the hierarchical name of the content, or based on a name of a member included in the at least one virtual community. An example of searching for the content by designating a search area using the hierarchical name of the content, and responding to a content request is described with reference to FIG. 6.

The content provider may provide a response. For example, the response may include a full name including a name of a virtual community or a full routable name of content suitable for a request received from the content search request packet.

In 340, the content provider generates a response packet including a full hierarchical name of the requested content according to a result of the search, and in 350, transmits the response packet including the full hierarchical name to the content requester.

In the examples of FIGS. 2 and 3, a user may request the content via a communication device which corresponds to the content requester.

Figure 4:
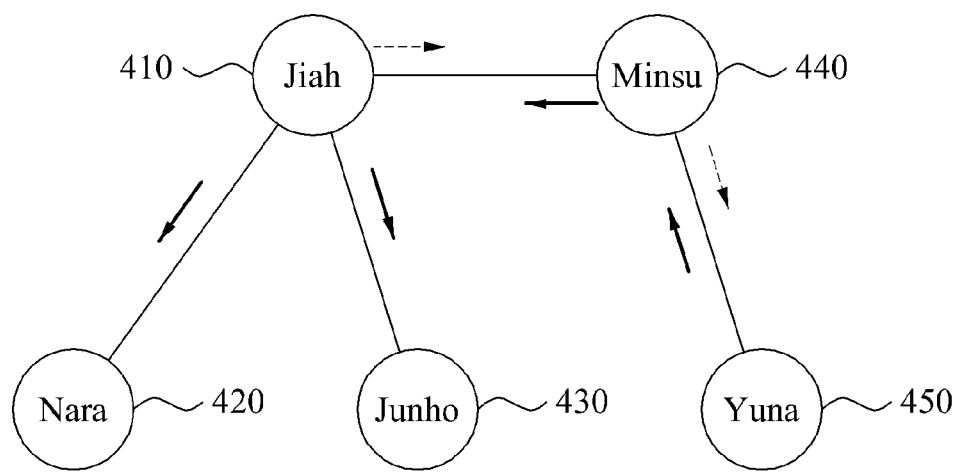
FIG. 4 is a diagram illustrating an example of searching for content based on a keyword requested by a content requester, and responding to a search request in a network based on a hierarchical name structure.
Figure 4:
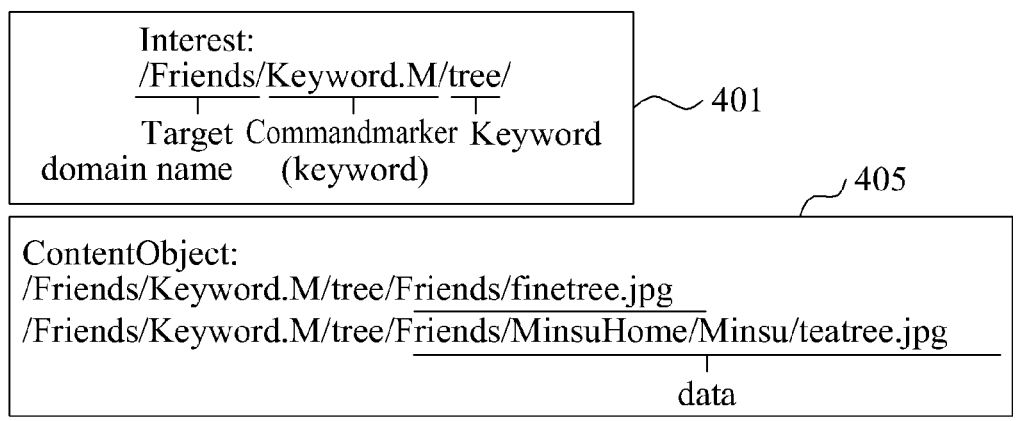

FIG. 4 illustrates an example of searching for content based on a keyword requested by a content requester, and responding to a search request performed by a content provider in a network based on a hierarchical name structure.

Referring to FIG. 4, Jiah 410 and Minsu 440, among Jiah 410, Nara 420, Junho 430 and Minsu 440, respond to a search request from Yuna 450. In this example, Yuna 450 corresponds to a content requester, and Jiah 410 and Minsu 440 correspond to content providers. Hereinafter, in FIG. 4 through FIG. 6, a solid line indicates a path through which a content search request packet is transmitted, and a dotted line indicates a path through which a response packet is transmitted.

Yuna 450 may transmit a content search request packet 401 (which may be referred to as an Interest) that requests a search for a content having a keyword "tree." In this example, Yuna 450 may transmit the content search request packet 401 to a "Friends" domain. The content search request packet 401 may be delivered to a communication device of Jiah 410 through a communication device of Minsu 440 which is connected to Yuna 450. In this example, a keyword may correspond to information matching a portion of a full hierarchical name of the content.

The communication devices receiving the content search request packet 401 may verify a search request corresponding to "keyword.M" that requests a predetermined domain, for example, "Friends" for a search using a predetermined keyword, for example, "tree" by analyzing the content search request packet 401. The communication devices may generate a response packet 405 including a full hierarchical name of content by processing the search request.

For example, if the communication device of Jiah 410 has "finetree.jpg," the communication device of Jiah 410 may respond to the content search request packet 401. Thus, the communication device of Jiah 410 may transmit, to Yuna 450, the response packet 405 that includes "/Friends/finetree.jpg" which corresponds to the full hierarchical name of the requested content including only the partial name "tree". As another example, if Minsu 440 has "teatree.jpg," Minsu 440 may transmit the response packet 405 including a hierarchical name of content in response to the content search request packet 401.

Thereafter, Yuna 450 receiving the response packet 405 may transmit a content request packet to a position of "/Friends/finetree.jpg" or to a position of "/Friends/Minsu-Home/Minsu/teatree.jpg" corresponding to a hierarchical name of content included in the response packet 405, and may receive a response packet including content (or data) in response to the content request packet.

In the "keyword.M" used in the content search request packet 401, ".M" denotes a command marker corresponding to an example of an indicator indicating a predetermined command, and may be inserted into a hierarchical name included in the content search request packet 401. Accordingly, if a communication device receiving the content search request packet 401 identifies an indicator, for example, the command marker ".M" by analyzing a hierarchical name of content, the communication device may perform a predetermined command, for example, a keyword search.

The content requester Yuna 450 may include a predetermined keyword, for example, "tree" in the content search request packet 401 after an indicator, for example, the command marker ".M" indicating a predetermined command, and may transmit the content search request packet 401. A communication device receiving the content search request packet 401 may perform a command defined by the corresponding indicator "keyword.M" when constructing a list packet or a response list. As a result of performing the command, a hierarchical name of content including the predetermined keyword "tree" may be included in the response packet 405, and may be transmitted.

The foregoing describes an example of indicating a search request using a command marker. As another example, in addition to the command marker, a field and a flag that may indicate a predetermined command (or condition), or various indicators that may perform a similar function may be used for the content search request packet 401 to indicate the search request. Accordingly, the content requester may use an indicator in a search request to indicate a predetermined command (or condition), and the content provider may transmit a response result according to the predetermined command.

In the example in which the field or the flag is used as an indicator that indicates the predetermined command (or condition), and the command marker is not included in the content search request packet 401, the content provider may perform a search according to the indicator with reference to the field or the flag included in the content search request packet 401, and may respond to the search request.

Figure 5:
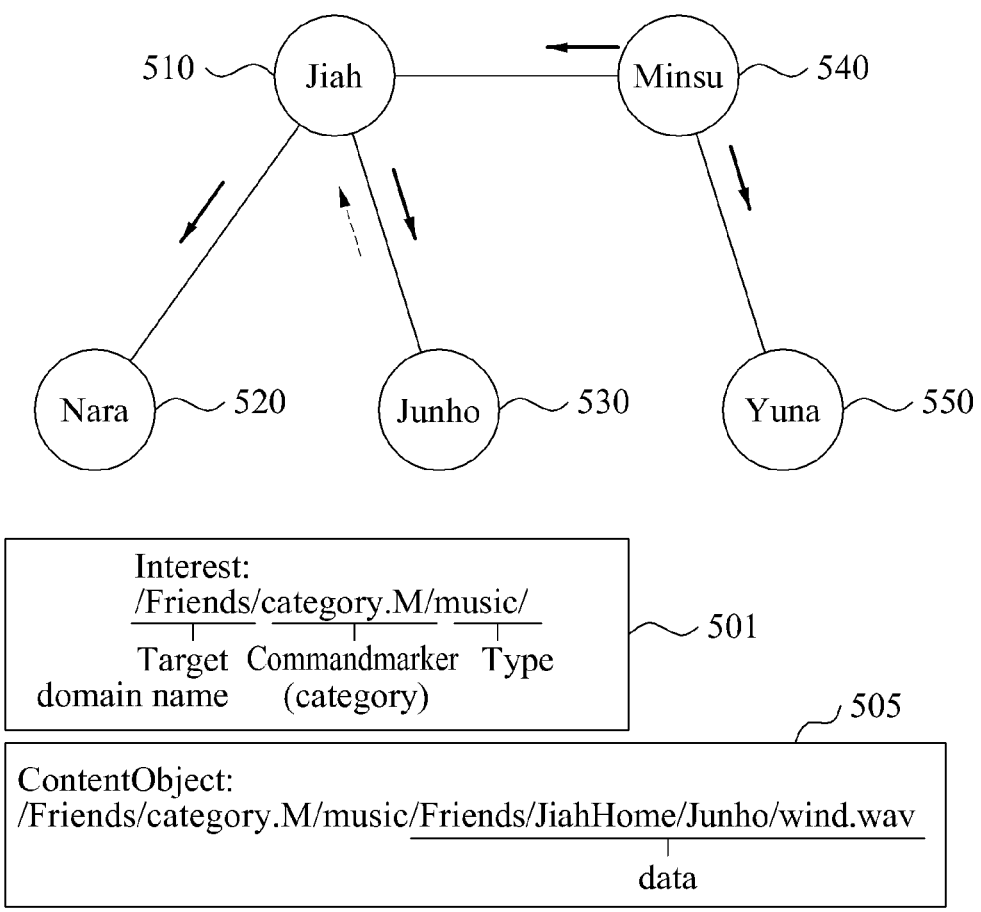
FIG. 5 is a diagram illustrating an example of searching for content based on information recognized based on metadata of content, and responding to a search request in a network based on a hierarchical name structure.

FIG. 5 illustrates an example of searching for content based on information recognized based on metadata of content, and responding to a search request performed by a content provider in a network based on a hierarchical name structure. Referring to the example of FIG. 5, Jiah 510 responds to a search request from Minsu 540.

Minsu 540 may transmit a content search request packet 501 requesting all of the corresponding contents based on a content type, for example, "music" included in information recognized by metadata of content in a domain, for example, a "Friends" domain. For example, content corresponding to the content type "music" may include a content associated with a music file such as .wav, .mp3, .wma, and the like.

In this example, Jiah 510, Nara 520, Junho 530, and Yuna 550 receive the content search request packet 501 transmitted from Minsu 540. Jiah 510 has content "wind.way." In the example of FIG. 5, Jiah 510 may recognize that .wav is associated with the content type "music" based on metadata. Accordingly, Jiah 510 may search for content including the .wav file. As a result, Jiah 510 recognizes "wind.wav". Accordingly, Jiah 510 may transmit a response packet 505 in response to the content search request packet 501 including the requested content.

For example, the information recognized based on metadata of content may include at least one of a content type, a date on which the content is generated, a location at which the content is generated, and a request frequency for the content and accumulation information including routing information for the content, generated due to a transmission of the content.

When content is searched for based on information recognized by metadata of the content, an item corresponding to a content type may be defined in the metadata of the content, or may be expressed as a portion of a content name.

In the example of searching for content based on metadata, the metadata of the content may include information excluded from a full name of the content. A range or an expression scheme may vary depending on a scheme of constructing a virtual community.

Figure 6:
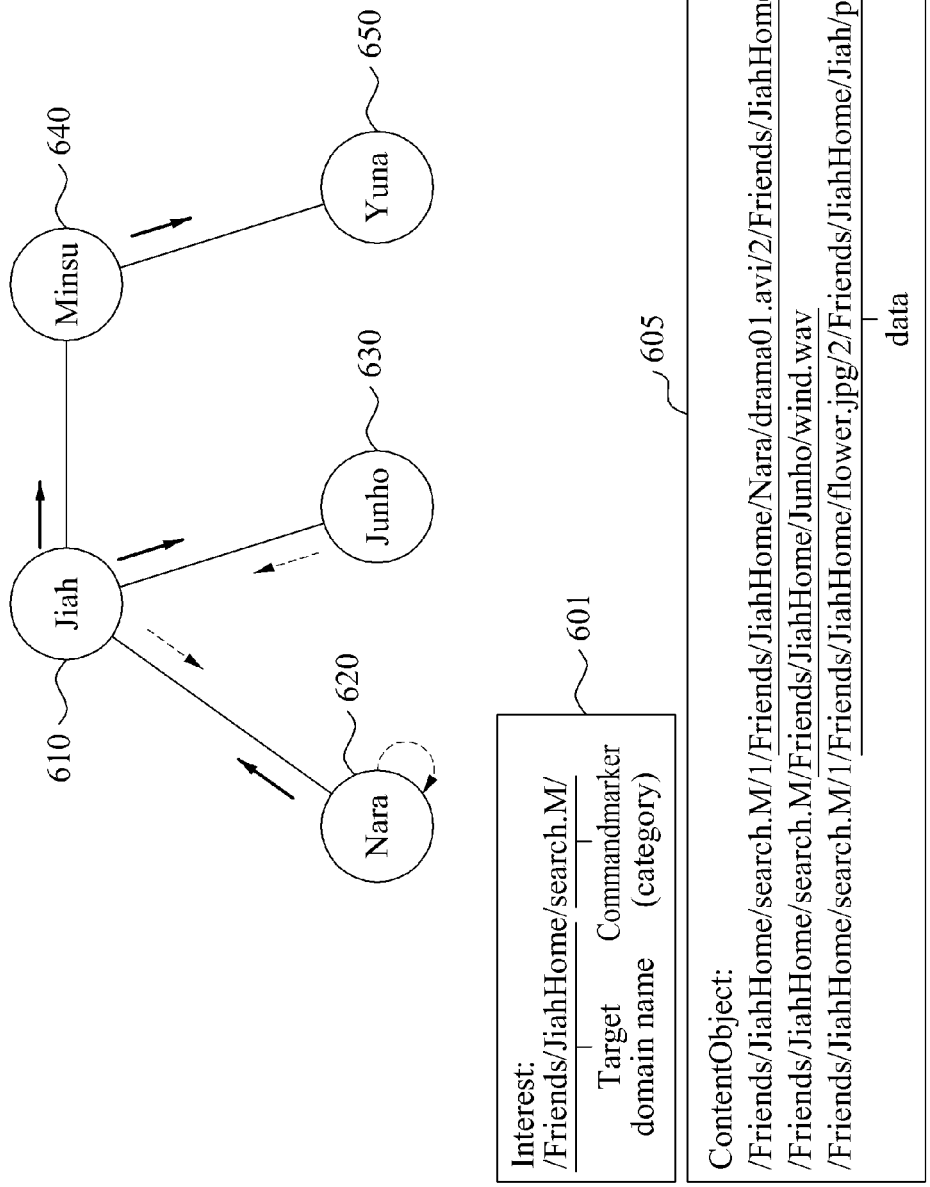
FIG. 6 is a diagram illustrating an example of searching for content by designating a search area using a hierarchical name of content, and responding to a search request in a network based on a hierarchical name structure.

FIG. 6 illustrates an example of searching for content by designating a search area using a hierarchical name of content, and responding to a search request in a network based on a hierarchical name structure. Referring to FIG. 6, Jiah 610, Nara 620, and Junho 630 respond to a search request of Nara 620.

Nara 620 may generate and transmit a content search request packet 601 including "/Friends/JiahHome/search.M/" to request a search for all contents of "JiahHome" within a domain "Friends." For example, the content search request packet 601 transmitted by Nara 620 may be transmitted to an entire community, Friend 160, which corresponds to the third virtual community illustrated in FIG. 1. A communication device (or member) having a content including "Friends/JiahHome" in a full hierarchical name of a content among communication devices (or members) included in the third virtual community may respond to the corresponding content search request.

Referring to FIG. 6, the communication devices corresponding to Jiah 610, Nara 620, and Junho 630 each have contents corresponding to "Friends/JiahHome." Accordingly, each of Jiah 610, Nara 620, and Junho 630 may transmit a response packet 605 in response to the content search request packet 601.

Here, Nara 620 has two corresponding contents as illustrated in Table 1. When a provider includes a plurality of requested contents such as Nara 620, Nara 620 may respond in a form of "/Friends/JiahHome/search.M/1/Friends/JiahHome/Nara/drama01.avi/2/Friends/JiahHome/Nara/drama02.avi." That is, if a response involves several content lists, they may be separated using a separator, for example, /1/ . . . /2/, and the like.

As another example, if Nara 620 has two communication devices, for example, a communication device 1 and a communication device 2, and "drama01.avi" is stored on the communication device 1, and "drama02.avi" is stored on the communication device 2, the response packet 605 may include two responses of "/Friends/JiahHome/search.M/Friends/JiahHome/Nara/drama01.avi" generated from the communication device 1 and "/Friends/JiahHome/search.M/Friends/JiahHome/Nara/drama02.avi" generated from the communication device 2.

As another example, if a communication device has two storage devices and another communication device has no storage device among communication devices of Nara 620, two responses may occur.

Referring to Table 1, contents of JiahHome corresponding to the second virtual community and Friends 160 corresponding to the third virtual community are stored in a communication device of the Jiah 610. Accordingly, a single response may occur from the communication device of the Jiah 610.

According to various searching schemes described herein, a search request for searching for content including a predetermined keyword in a predetermined virtual community, or a search request for searching for document content including a predetermined keyword, and the like, may be given. In response one or more of the searching schemes may be used, or a combination of the searching schemes may be used. Further, content may be searched for within a predetermined range.

In this example, a content requester may define an indicator such as a new command marker, a new flag, and the like. As an example, "/keyword&VC.M/", "/keyword& document.M/," and the like, may be defined as the new command marker, and "/doAND/", "/doOR/," and the like that limit a predetermined condition when a search is performed using several keywords may be given as the new flag. It should be appreciated that the new command marker or the new flag may be modified as desired.

Using aforementioned schemes, even though an entire prefix of content is not fully provided, the content may be searched for by designating a predetermined word or even a combination of one or more letters and/or characters included in a name of the content. If a predetermined attribute of content is provided, the content may be searched for using metadata, and it may be possible to request a content search and receive a response by to designating a search area of the content based on a name of a virtual community, and a name of a member in the community having a hierarchical structure.

Figure 7:
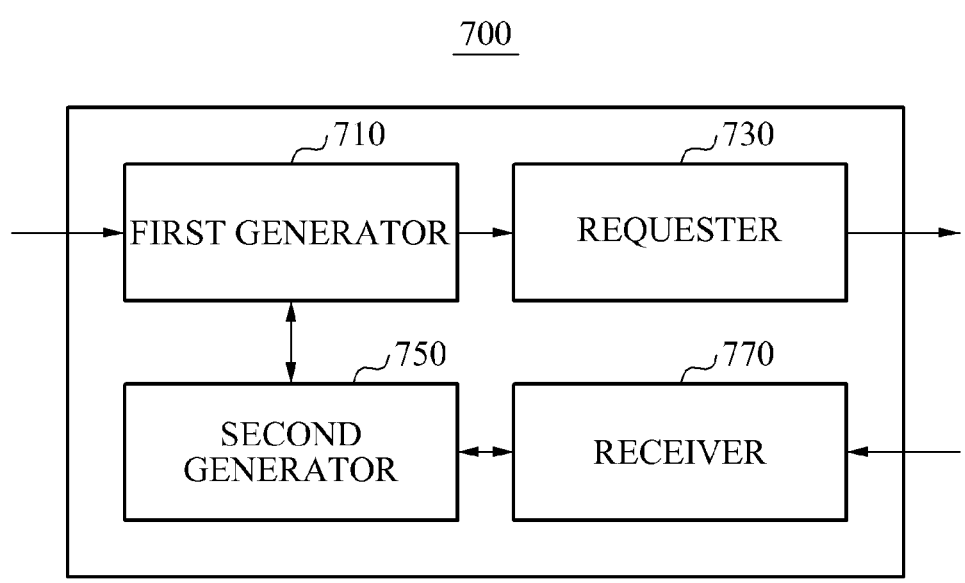
FIG. 7 is a diagram illustrating an example of a content requester in a network based on a hierarchical name structure.

FIG. 7 illustrates an example of a content requester in a network based on a hierarchical name structure.

Referring to FIG. 7, content requester 700 includes a first generator 710 and a requester 730. The content requester 700 may further include a second generator 750 and a receiver 770.

The first generator 710 may generate a content search request packet including at least a portion of a hierarchical name of content corresponding to a content search request. For example, the first generator 710 may generate the content search request packet by inserting an indicator indicating a predetermined command into the content search request packet. The indicator may include a command marker, a field, a flag, and the like.

The requester 730 may request a search for the content by at least one communication device included in at least one virtual community in the network based on a hierarchical name structure by transmitting the content search request packet.

The receiver 770 may receive, from the at least one communication device, a first response packet including the hierarchical name of content corresponding to the content search request.

The second generator 750 may generate a content request packet requesting the at least one communication device for the content corresponding to the content search request based on the first response packet received by the receiver 770.

The receiver 770 may further receive a second response packet, transmitted from the at least one communication device, including the content corresponding to the content search request in response to the content request packet.

FIG. 8 illustrates an example of a content provider in a network based on a hierarchical name structure.

The content provider 800 includes a receiver 810, an analyzer 830, a searching unit 850, a generator 870, and a transmitter 890.

The receiver 810 may receive a content search request packet from at least one communication device included in at least one virtual community in the network based on a hierarchical name structure.

The analyzer 830 may analyze the content search request packet. For example, the content search request packet may include at least a portion of a hierarchical name of at least one content corresponding to a content search request. The analyzer 830 may identify the portion of the hierarchical name.

The searching unit 850 may search for the at least one content corresponding to the content search request based on a result of the analysis.

The generator 870 may generate a response packet including the hierarchical name of the at least one content.

The transmitter 890 may transmit, to a content requester, the response packet generated in the generator 870.

According to various examples herein, by performing a content search using a virtual community in a network based on the hierarchical name structure, it is possible to request a content, search for the content, and respond to the request using only a portion of the content name or a content attribute.

According to various examples herein, by inserting an indicator into a content search request packet, it is possible to designate an attribute or a keyword for a desired content, or designate a search area.

According to various examples herein, content may be easily retrieved using a network characteristic without a separate index server that manages full name information of the content.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method for a content requester in a network based on a hierarchical name structure, the communication method comprising:
generating a content search request packet comprising a portion of but not an entire hierarchical name of content corresponding to a content search request; and
requesting a communication device included in at least one virtual community in the network based on a hierarchical name structure to search for the content by transmitting the content search request packet.

2. The communication method of claim 1, wherein the at least one virtual community comprises at least one of:
a first virtual community as a lowest level community including the communication device,
a second virtual community as a higher level community than the first virtual community, and sharing information with the first virtual community and being combined with the first virtual community, and
a third virtual community as a higher level community than the second virtual community, sharing information of the second virtual community, and being generated by an interconnection between the second virtual community.

3. The communication method of claim 2, wherein the communication device comprises content having a prefix for each of the first virtual community, the second virtual community, and the third virtual community, and comprises a hierarchical name generated based on a content name included in the at least one communication device.

4. The communication method of claim 1, further comprising:
receiving, from the communication device, a first response packet comprising the hierarchical name of content requested by the content search request;
generating and transmitting a content request packet requesting the communication device for the content corresponding to the content search request; and
receiving a second response packet, transmitted from the communication device, comprising the content corresponding to the content search request.

5. The communication method of claim 1, wherein the generating comprises inserting an indicator into the content search request packet, the indicator indicating a predetermined command.

6. The communication method of claim 1, wherein the generating comprises inserting an indicator into the content search request packet, the indicator designating a search area based on the hierarchical name of the content.

7. The communication method of claim 1, wherein the generating comprises inserting an indicator into the content search request packet, the indicator designating a search area based on a name of the at least one virtual community recognized using the hierarchical name of the content, or based on a name of a member included in the at least one virtual community.

8. The communication method of claim 1, wherein the generating comprises inserting an indicator into the content search request packet, the indicator requesting a search for the content based on a keyword requested by the content requester.

9. The communication method of claim 1, wherein the generating comprises inserting an indicator into the content search request packet, the indicator requesting a search for the content based on information recognized based on metadata of the requested content.

10. The communication method of claim 9, wherein the information recognized based on the metadata of the requested content comprises at least one of a content type, a date on which the content is generated, a location at which the content is generated, and a request frequency for the content and accumulation information including routing information for the content, generated due to a transmission of the content.

11. The communication method of claim 1, wherein the generating comprises inserting an indicator into the content search request packet, the indicator generated by combining at least two of the hierarchical name of the content, a keyword requested by the content requester, and information recognized based on metadata of the requested content.

12. A communication method for a content provider in a network based on a hierarchical name structure, the communication method comprising:
    analyzing a content search request packet comprising a portion of but not an entire hierarchical name of content corresponding to a content search request which is received from a content requester included in at least one virtual community in the network based on the hierarchical name structure;
    searching for the requested content based on a result of the analysis;
    generating a response packet comprising the entire hierarchical name of the requested content; and
    transmitting the response packet to the content requester.

13. The communication method of claim 12, wherein the at least one virtual community comprises at least one of:
    a first virtual community as a lowest level community including the content provider,
    a second virtual community as a higher level community than the first virtual community, sharing information of the first virtual community and being combined with first virtual community, and
    a third virtual community as a higher level community than the second virtual community, sharing information the second virtual community, and being generated by an interconnection between the second virtual community.

14. The communication method of claim 13, wherein the content provider comprises content having a prefix for each of the first virtual community, the second virtual community, and the third virtual community, and that has a hierarchical name generated based on a content name included in the content provider.

15. The communication method of claim 12, wherein the analyzing comprises:
    separating an indicator, indicating a predetermined command, inserted into the content search request packet; and
    analyzing the predetermined command recognized from the separated indicator.

16. The communication method of claim 12, wherein the searching comprises searching for the content by designating a search area based on the hierarchical name of the content.

17. The communication method of claim 12, wherein the searching comprises searching for the content by designating a search area based on a name of the at least one virtual community recognized using the hierarchical name of the content, or based on a name of a member included in the at least one virtual community.

18. The communication method of claim 12, wherein the searching comprises searching for content based on a keyword requested by the content requester.

19. The communication method of claim 12, wherein the searching comprises searching for the content based on information recognized based on metadata of the requested content.

20. The communication method of claim 12, wherein the method further comprises:
    receiving a request for the content corresponding to the entire content name from the content requester; and
    providing the requested content to the content requester.

21. A non-transitory computer-readable medium comprising a program for instructing a computer to perform the method of claim 1.

22. A content requester in a network based on a hierarchical name structure, the content requester comprising:
    a generator configured to generate a content search request packet comprising a portion of but not an entire hierarchical name of content corresponding to a content search request; and
    a requester configured to transmit a request for a search for the content to at least one communication device included in at least one virtual community in the network based on a hierarchical name structure.

23. A content provider in a network based on a hierarchical name structure, the content provider comprising:
    an analyzer configured to analyze a content search request packet comprising a portion of but not an entire hierarchical name of content corresponding to a content search request which is received from a content requester included in at least one virtual community in the network based on the hierarchical name structure;
    a searching unit configured to search for the requested content corresponding to the content search request based on a result of the analysis; and
    a generator configured to generate a response packet comprising the entire hierarchical name of the requested content.

* * * * *